United States Patent [19]
Wachtell et al.

[11] 3,802,046
[45] Apr. 9, 1974

[54] METHOD OF MAKING OR RECONDITIONING A TURBINE-NOZZLE OR THE LIKE ASSEMBLY

[75] Inventors: Richard L. Wachtell, Tuxedo Park; Edward C. Palmenberg, Nanuet, both of N.Y.

[73] Assignee: Chromalloy American Corporation, Orangeburg, N.Y.

[22] Filed: Jan. 27, 1972

[21] Appl. No.: 221,306

[52] U.S. Cl. .............................. 29/156.8 R, 29/401
[51] Int. Cl. ......................... B21k 3/00, B23p 7/00
[58] Field of Search ........ 29/156.8 R, 401, 156.8 B; 415/115, 217; 416/214

[56] References Cited
UNITED STATES PATENTS

| | | | |
|---|---|---|---|
| 1,470,507 | 10/1923 | Steenstrup | 29/156.8 R |
| 3,650,635 | 3/1972 | Wachtell | 29/401 |
| 1,740,800 | 12/1929 | Wiberg | 29/156.8 R |
| 3,540,810 | 11/1970 | Kercher | 415/115 |
| 3,301,527 | 1/1967 | Kercher | 415/115 |
| 1,717,203 | 6/1929 | Gottschalk | 415/217 |
| 2,434,935 | 1/1948 | Kroon | 29/156.8 B |
| 1,966,104 | 7/1934 | Noack | 29/156.8 B |
| 1,932,264 | 10/1933 | Dickinson | 29/156.8 R |

OTHER PUBLICATIONS
Navy Department, Manual of Engineering Instructions, Bureau of Engineering, Section I, Chap. 7, 1930, pp. 38–43

Primary Examiner—Charles W. Lanham
Assistant Examiner—D. C. Crane
Attorney, Agent, or Firm—Sandoe, Hopgood and Calimafde

[57] ABSTRACT

The invention contemplates a multi-part construction for a turbine-nozzle assembly, to take the place of certain single-piece investment castings currently in use for such assemblies, intended primarily for gas-turbine application. The construction basically employs a blade element of desired airfoil-section development, and two base members, each locally recessed to define a locating socket or opening for the respective longitudinal ends of the blade. The recesses are carefully controlled in their location with respect to base-member geometry, to the end that the assembly may produce a given performance-class number for the resulting nozzle, once assembled and united into an integral whole, by welding, brazing, coating and the like finishing steps. The construction is described in the context of methods of achieving the same (a) as new construction and (b) as repair of worn conventional constructions, i.e., constructions which were originally fabricated as single-piece investment castings, but which have served their normal life span and are therefore consigned to disposal as scrap. The invention is also described in the context of application (a) to a single-piece gas-turbine nozzle assembly or stage, and (b) to a single-piece nozzle-component assembly.

16 Claims, 22 Drawing Figures

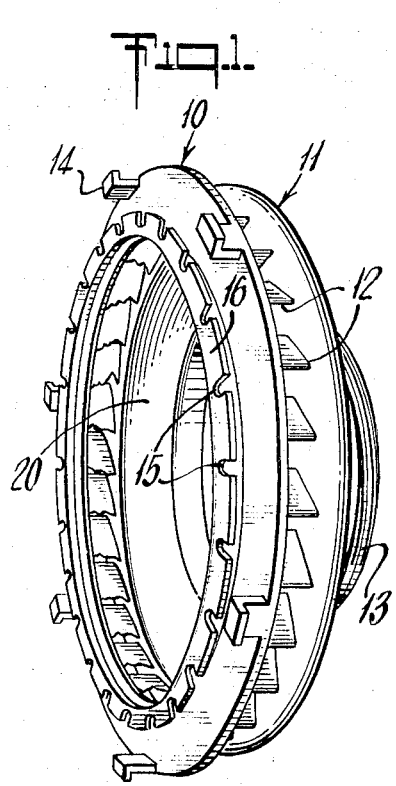
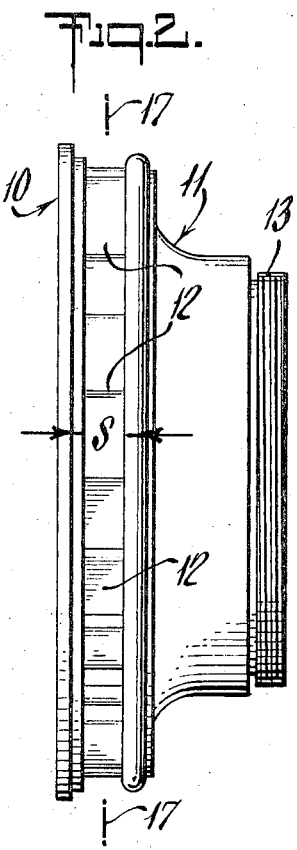
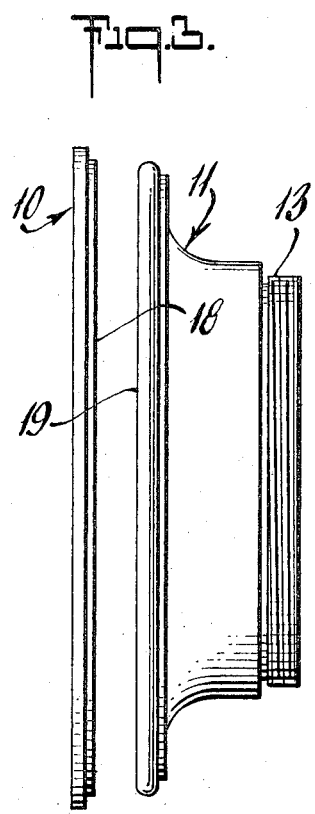
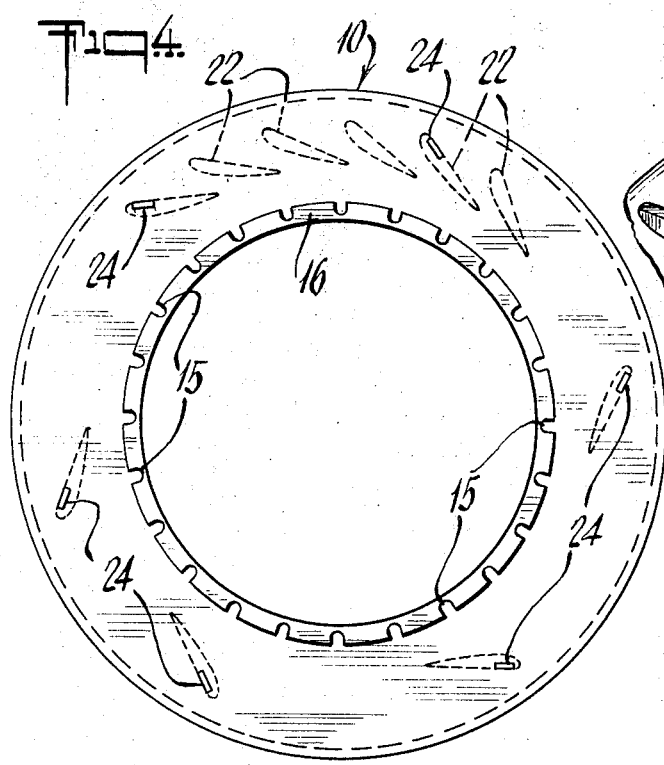
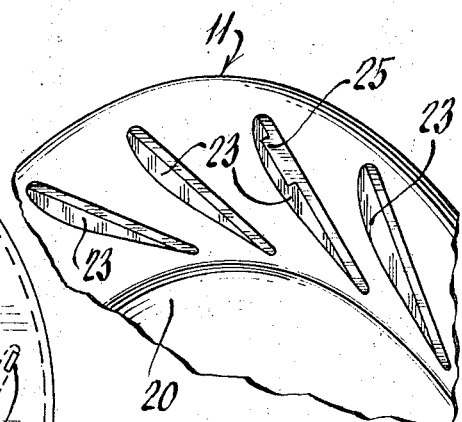

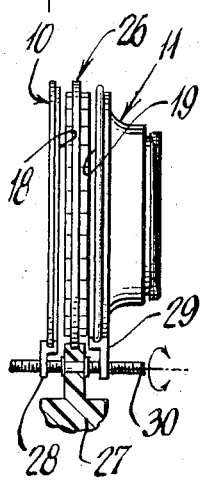
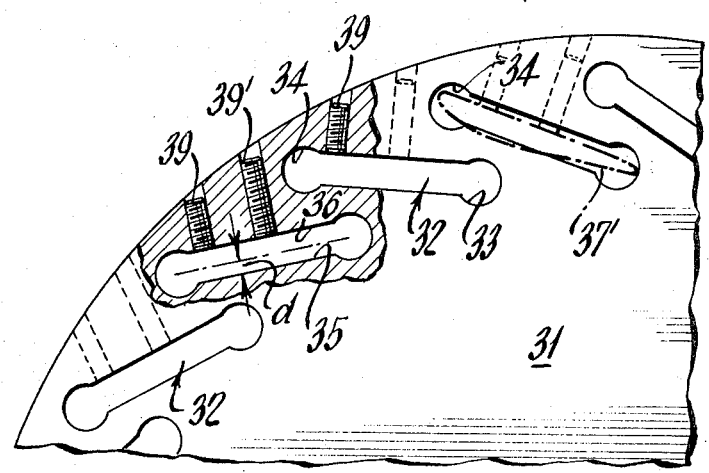
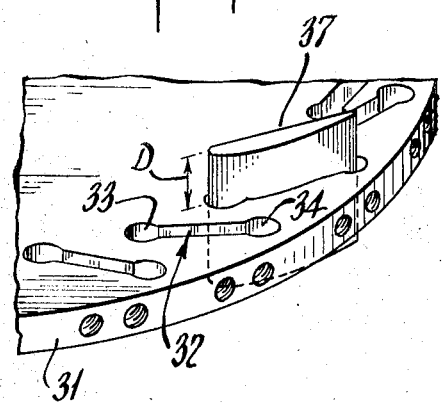
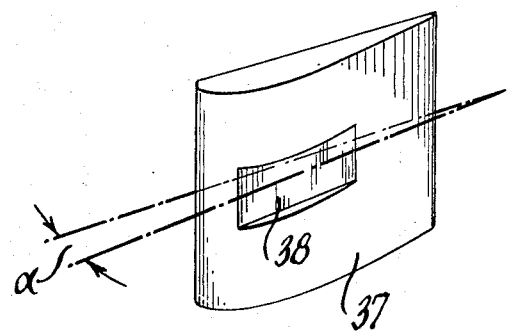
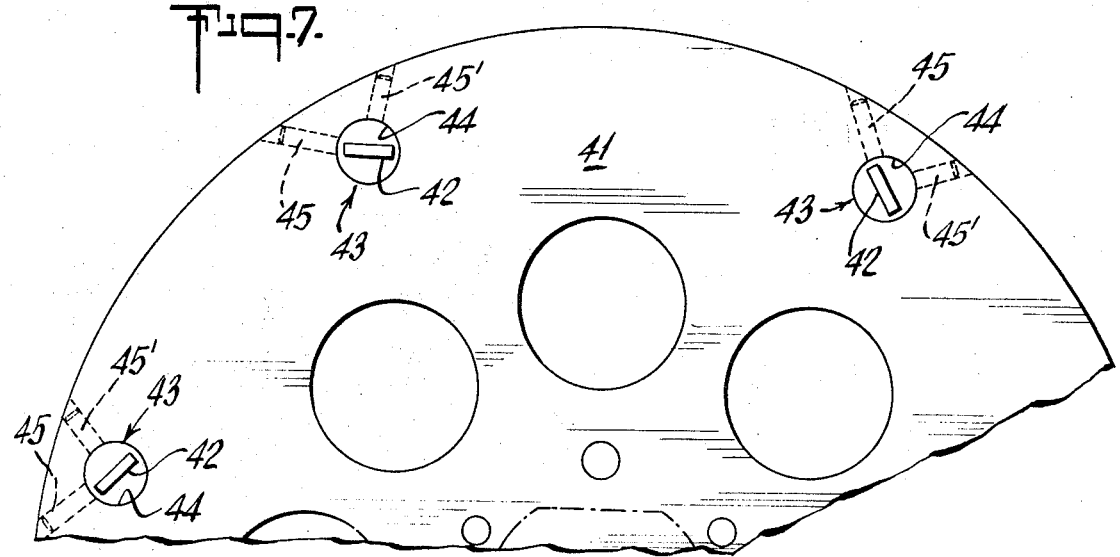

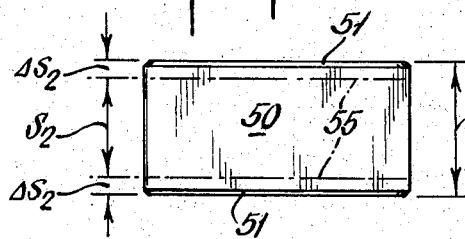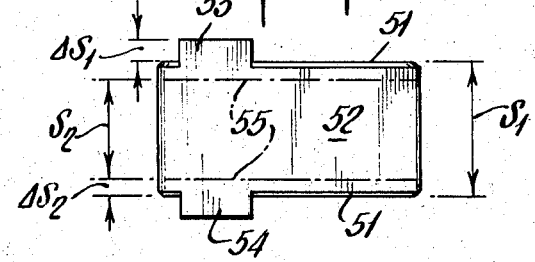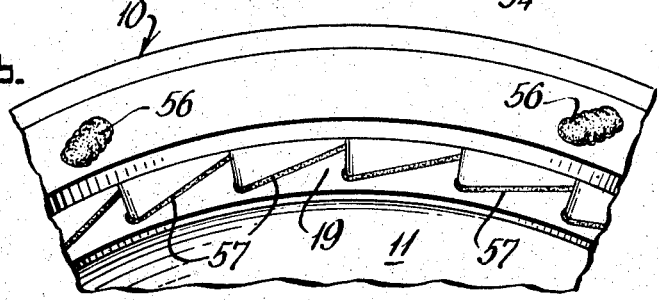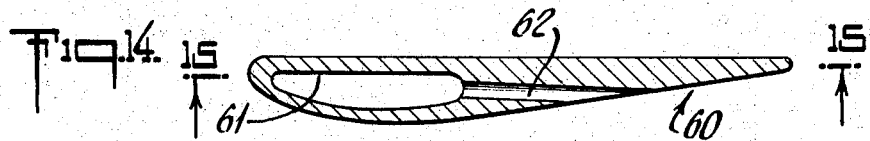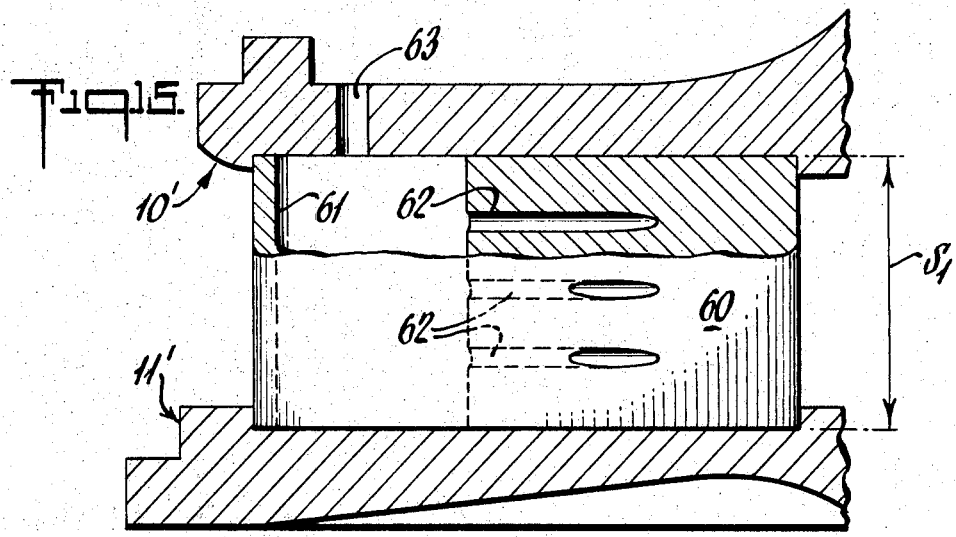

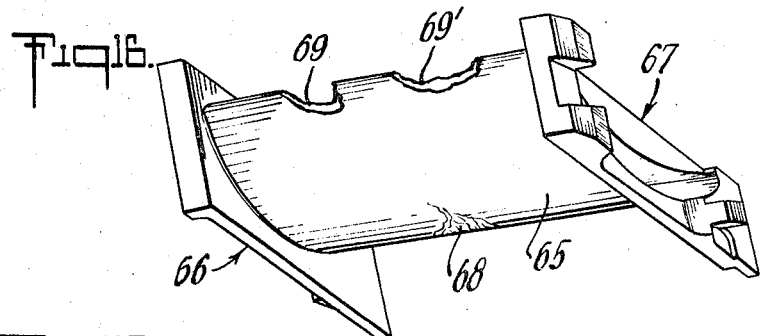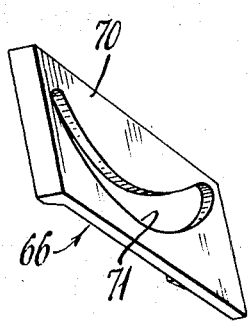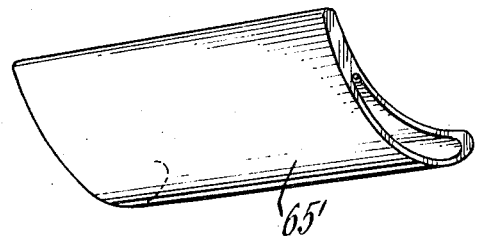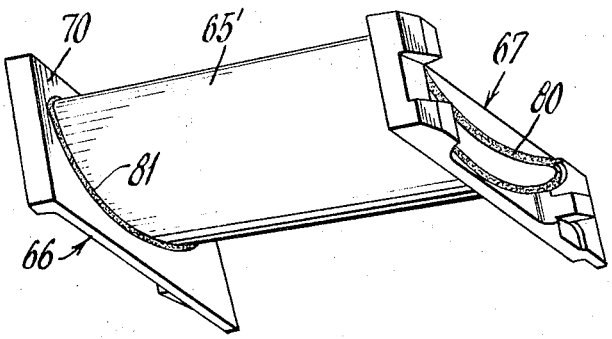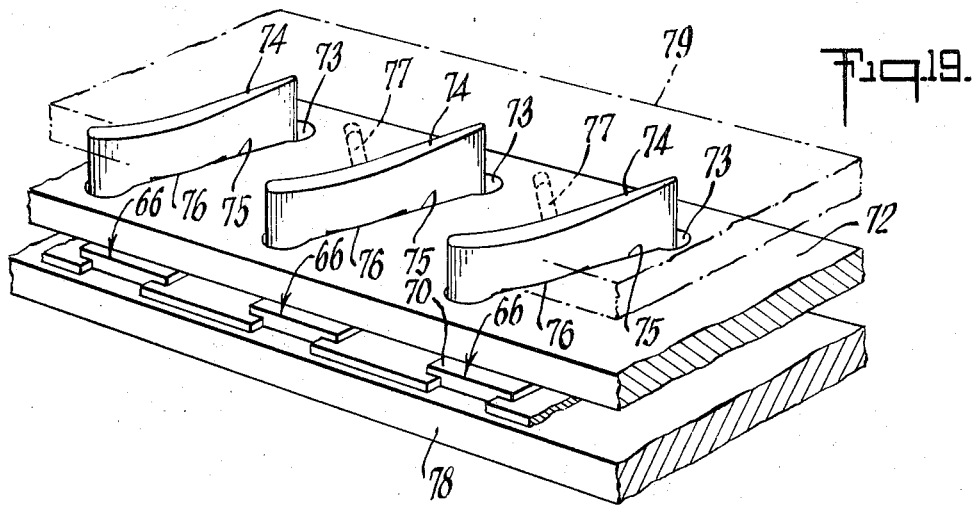

3,802,046

METHOD OF MAKING OR RECONDITIONING A TURBINE-NOZZLE OR THE LIKE ASSEMBLY

This invention relates to the construction and reconstruction of nozzle assemblies and nozzle-component assemblies for use in gas turbines.

Turbine-engine nozzle guide vanes or blades are subjected to rapid extremes of temperature and differential-pressure loading, in the context of high flow rates, and as a result the individual parts comprising a nozzle assembly become bent, eroded and otherwise distorted. Any local departure of nozzle-throat area from design conditions establishes an asymmetry of flow and pressure distribution at any given engine stage, accelerating the destructive process. Since the nozzle assemblies, or nozzle-component assemblies as the case may be, are conventionally investment castings of superalloy materials, their replacement is expensive and various repair techniques attempt to salvage as much as possible of the original casting. Hot-forming, inlaying of blade edges, and filling are among the several techniques in use, all basically operative on the entire original casting, i.e., on the blade with its integrally cast end-base members.

It is an object of the invention to provide a new construction for a nozzle assembly or nozzle-component assembly of the character indicated and lending itself to new-construction and to the repair or reconstruction of a worn assembly.

It is a specific object to achieve the above object in application to an assembly which is so far worn as to be deemed unacceptable for reconditioning by existing techniques and, therefore, consignable to the scrap heap.

It is a further specific object to achieve the foregoing objects with such a high degree of control of blade size, orientation and location that nozzle class can be specified and held within limits which are at least as close as those by which conventional original castings (or assembles of original castings) are judged.

Another object is to provide a construction of the character indicated wherein investment-casting techniques and requirements are substantially simplified.

It is also an object to provide such a construction wherein a greater latitude is inherently available, as to choice and use of materials.

It is a general object to achieve the foregoing objects with constructions and methods which can be applied with relative simplicity using existing tools and technology, and at competitive and relatively low cost.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

FIG. 1 is a perspective view of a gas-turbine nozzle assembly, being specifically a nozzle guide-vane assembly for an auxiliary power unit, and exhibiting wear such as to render the same unfit or further use, but nevertheless repairable in accordance with the invention;

FIG. 2 is a side elevation of the assembly of FIG. 1, to illustrate a first repair step of the invention;

FIG. 3 is a view as in FIG. 2, to illustrate another step;

FIG. 4 is left-end view of the left base member of FIG. 3, to illustrate another step.

FIG. 5 is a simplified diagram to illustrate movable support of the members of FIG. 3 in conjunction with an electrical-discharge machining tool;

FIG. 6 is an enlarged fragmentary plan view of an electrode holder used in the apparatus of FIG. 5 for performing the step of FIG. 4, said view being partly broken-away and in section to reveal internal construction;

FIG. 6A is a fragmentary perspective view of the holder of FIG. 6, with a mounted electrode element;

FIG. 6B is a perspective view of the electrode element of FIG. 6A;

FIG. 7 is a view as in FIG. 6, to illustrate a second electrode holder used to perform the step of FIG. 4;

FIG. 8 is an enlarged fragmentary perspective view of the blade-supporting face of the base member at the right side of FIG. 3, to illustrate the step of FIG. 4 as applied to said base member;

FIGS. 9 and 10 are, respectively, side-elevation and plan views of one kind of blade element to be assembled to the base members of FIGS. 4 and 8;

FIGS. 11 and 12 are views corresponding to FIGS. 9 and 10, respectively, to show a second kind of blade element to be assembled to the base members of FIGS. 4 and 8;

FIG. 13 is a fragmentary perspective view of the completed reconstruction of the assembly of FIG. 1;

FIGS. 14 and 15 are views corresponding to FIGS. 9 and 10, respectively, to show a modified blade element, with FIG. 15 being partly in section at the plane 15—15 of FIG. 14 and in the context of adjacent base-member structure;

FIG. 16 is a simplified view in perspective of a single-piece nozzle-component assembly, being a buttress-type guide-vane assembly for a jet-aircraft engine, and exhibiting wear such as to render the same unfit for further use, but nevertheless repairable in accordance with the invention;

FIG. 17 is a perspective view of the left buttress of FIG. 16, after performing several steps of the invention;

FIG. 18 is a perspective view of a new blade element, for assembly to the buttress of FIG. 17;

FIG. 19 is a simplified fragmentary perspective view of work-holder and tool-holder parts for performing one of the operations to make the buttress of FIG. 17; and FIG. 20 is a perspective view of the completed reconstruction of the assembly of FIG. 16.

Briefly stated, in application to the repair of damaged gas-turbine nozzle structures, the invention contemplates removal of all original blade material and its replacement with new individually cast blades, relying upon precision machining of base-member material of the original structure in such manner as to orient the assembled parts and to permit the resulting nozzle-throat area to be controlled with a high degree of dimensional precision. The assembly is consolidated into an integral whole, by welding the new blades to the machined original base members, and by a high-temperature braze operation. Following this, the assembly is given a protective coating to minimize the effects of high-temperature oxidation.

The invention is first shown in application to the nozzle guide-vane assembly (FIG. 1) of a gas-turbine used in aircraft as an auxiliary power unit, i.e., a prime mover for stand-by generation of electric power. The particular assembly shown in FIG. 1 is a single investment casting of left and right annular base or vane-supporting members or rings 10–11, integrally united to an angularly spaced plurality of vanes or blades 12 for accommodating radially inward and circumferentially swirling flow of hot gases within the engine. The particular assembly is a stator within which a suitably formed impeller (not shown) is supported for rotation and for discharge of the gas flow axially out the right end of the right-hand base member 11. The conventional means of attachment of the stator to other engine structure include external threads 13 at the reduced discharge end of member 11, spaced radial lugs or feet 14 at the periphery of member 10, and clamp slots 15 in a radial flange 16 of member 10.

The stator of FIG. 1 is shown with substantial damage at all or most of the radially inner or trailing edges of the vanes 12. The extent of the damage is typical of that which would normally call for scrapping the entire stator assembly, i.e., replacement with a new and relatively expensive single integral investment casting of the entire stator. However, the present invention permits reconstruction of the stator to at least the performance capabilities of the original, at but a fraction of the original cost.

Referring to FIGS. 2 and 3, the first step is to remove all blade material. This is suggested in FIG. 2 at 17, being an alignment for cutting (e.g., sawing) the vanes 12 at substantially mid-span. Once cut, vane fragments remain as cantilevered stubs, projecting axially from each of two, now separate, base members 10–11. Following a stress-relieving heat cycle, a machining operation (including surface grinding) is used to restore base member reference surfaces 18–19 (from which the original vanes 12 extended) to the desired degree of flatness. In this part of the process, it will be understood that, if necessary, any surface defects and deteriorated areas of the base members 10–11 are repaired by welding and remachining, as required to achieve the design reference surfaces 18–19. Also in this part of the process, the turbine scroll section 20 is repaired and/or machined as may be necessary to achieve design contour.

The base-member reference surfaces 18–19 are now ready for machining to form airfoil-shaped sockets conforming to the vane-airfoil configuration. This step is preferably done by electrical discharge machining (EDM), i.e., spark-discharge removal of base-member metal, in a circulating dielectric medium. While this may be done as a succession of different socket-machining operations, it is preferred to generate all sockets in both reference surfaces 18–19 at one and the same time. More particularly, in a first step, all vane sockets 22 in base member 18 and all vane sockets 23 in base member 19 are machined to desired depth, and, in a second step only certain sockets are further bored all the way through the respective base members, as suggested at 24–25 in the respective base members, for tensioned blade-element anchorage, as will be explained. In a typical configuration wherein the net blade span S, i.e., between reference surfaces 18–19, is about 2.2 cm, the machined depth of sockets 23 is about 0.06cm, in base member material which is in the order of 0.4cm thick.

FIG. 5 schematically shows support and manipulative means for performing the indicated EDM operation. Specifically, a tool holder or electrode 26 is positioned by fixed means 27 within the dielectric bath, and the reference surfaces 18–19 of base members 10–11 are held by suitable support means 28–29, in face-to-face relation with each other and with adjacent parts of electrode 26. The support means 28–29 are shown as slides longitudinally displaceable in opposite directions, upon rotation of a differential lead screw 30 having a first direction of threaded engagement with means 28 and an opposite direction of threaded engagement with means 29. Thus, rotation of lead screw 30 will simultaneously feed or retract both base members 10–11 with respect to electrode 26, depending upon the direction of rotation, as suggested by a double-headed curved arrow. Of course, it will be understood that the support and guide system for tool and work includes adequate provision for holding strict axial alignment and angular register of tool and work at all times.

FIGS. 6, 6A and 6B illustrate detail of the electrode structure for performing the first EDM step, namely, generating all vane-airfoil sockets 22–23. A relatively thick circular base plate 31 is characterized by plural spaced slot openings 32, larger than the vane-airfoil section but precisely positioned and formed in accordance with the design number and spacing of vanes 12. The inner and outer limits of openings 32 are formed as precisely indexed drilled holes 33–34, between which spaced substantially parallel inner and outer walls 35–36 complete the openings 32. Each inner wall 35 is a flat reference surface for positioning orientation of an inserted electrode element 37 (FIG. 6B), of vane-airfoil section; as shown, a locating flat 38 is milled or ground in the convex airfoild surface of electrode element 37 for positively referenced abutment with inner wall 35, said flat preferably straddling the region of closest proximity to the trailing (inner) edge of the next-adjacent vane. Wall 35 is offset in the amount $d$ from the line between centers for each pair of bores 33–34, the offset $d$ being selected to position the trailing (inner) edge of the electrode element 37 at substantially the point of intersection between said line and the inner side of the bore 33; this relationship is illustrated by phantom outline of an electrode-element airfoil section 37′ at one of the openings 32 in FIG. 6 and will be seen to assure utmost radial-positioning accuracy in the insertion of each electrode element 37. Each element 37 is of the same axial extent, being selected to project by equal amounts D beyond both faces of the base plate or tool holder 31. To secure such position, clamp screws 39—39′ engage tapped holes between the outer wall 36 of each opening 32 and the peripheral wall of the plate; and, as best seen in FIG. 6B, the airfoil surface of the electrode 37 is presented to receive the clamp forces of screws 39—39′. Preferably, the tapped holes for screws 39—39′ are aligned to straddle the throat-defining region (closest proximity to trailing edge of adjacent airfoil), all as best seen in FIG. 6.

It will be seen that the described electrode base 31 and element 37 structure enables tool-room precision and techiques to be applied to the assembly of a particular electrode structure. Electrode-element material, which may for example be cast copper or graphite, machined tungsten-copper alloy or extruded copper, is conveniently formed as elongate bars, which need only be cut to length as needed for particular electrode elements 37. Then, depending upon the class number (throat area) desired for a particular vane assembly, the flat 38 is generated for all electrode elements 37 of the tool assembly, at a precise angle α to the flat surface or other reference axis of the air-foil section. For example, in the context of vane dimensions generally indicated above, and for a 23-vane stator of about 30-cm overall diameter, a useful succession of nozzle-throat areas is achievable with the same vane-airfoil section and same electrode-element stock, by machining the flat 38 at constant depth (at the throat-line region of the convex surface of the airfoil section) and at a selected angle α in the range 0°4' to 3°12', corresponding respectively to a total nozzle-throat area range of 40 to 50 cm².

Thus far, the detailed description has been concerned only with the first EDM step, namely, precision-forming of the airfoil sockets 22-23. The second EDM step involves boring the openings 24-25, to permit tensed anchorage of the assembly.

FIG. 7 illustrates another tool-holder or electrode base 41, of thickness and circular extent corresponding to the base 31, and usable at 26 (FIG. 5) in the work and tool-supporting and feeding mechanism. As shown, at spacings no more than every fourth vane position, the bottom of the vane socket is EDM-bored with a rectangular section, as determined by the end formation 42 of a rod-like electrode element 43. Each of the elements 43 is positioned in drilled bores 44 in plate 41, being securely held in position by clamp screws 45—45', the orientation of each projection 42 being preferably such that its elongation axis is parallel to the elongation axis of the socket bottom (22, 23). The EDM process proceeds as with the tool of FIGS. 6 and 6A, upon feeding rotation of lead screw 30 to full traverse of the base-member thickness, as will be understood.

FIGS. 9 and 10 and FIGS. 11 and 12 respectively illustrate the two types of blade element used to complete assembly. The blade element 50 of FIGS. 9 and 10 is used at those socket locations 22-23 which are not provided with the through bores 24-25. Blade element 50 may be an individual investment casting of suitable alloy, or it may be cut to length $S_1$ from an elongate bar of extruded or otherwise formed alloy of vane-airfoil section. The length $S_1$ exceeds the ultimate vane span S, to the extent of the combined depths of socket recesses 22-23. Preferably, the span-end edges are chamfered, as indicated at 51, to permit secure bottom-referenced seating in sockets 22-23. The blade element 52 of FIGS. 11 and 12 may be similar in all respects to that of FIGS. 9 and 10, except for integral tang projections 53 beyond span $S_1$, of sectional proportions to fit the bores 24-25 and of projecting length $\Delta S_1$ to pass fully through bores 24-25. As a step preliminary to assembly to the EDM-processed base members 10-11, blades 50-52 are preferably given an electroplated coating of suitable "wetting" metal to an extent $\Delta S_2$, as indicated by light-phantom margin limits 55, at spacing $S_2$, in FIGS. 10 and 12. The spacing $S_2$ is preferably less than the ultimate vane span S so that fluxing treatment extends beyond base members 10-11, for fillet-holding purposes, as will become clear.

To complete the structure, all tang ends 53 are welded directly to members 10-11 at axially outer ends of the bores 24-25, thus providing tensed-tang retention of blade elements 52 in seated relation with associated socket bottom (22-23); such retention also compressionally retains the remaining blade elements 50 in abutment with their socket bottoms (22-23). Additionally, a predetermined amount of brazing filler material (compatible with the material of the flux plating, to margins 55) is placed at each of the vane interfaces with members 10-11 to permit fillet formation and complete filling of the vane-ring joint. Brazing of the clamped assembly may be performed in a vacuum furnace after an appropriate heating and stabilization cycle at intermediate temperatures. After stabilizing for the proper brazing operation, the furnace is allowed to cool while maintaining the desired vacuum level and until a temperature of approximately 1,500°F. is reached. Argon may then be admitted as a backfill gas to increase the rate of cooling to room temperature.

The indicated welding and brazing operations produce weldments 56 (FIG. 13) and fillets 57, it being understood that the brazing material has achieved a void-free fill of the chamfered and other vane-socket interface regions. The completed assembly of FIG. 13 is then inspected for braze imperfections, and dimensional checks are made for throat-area control. Once past such checking, the assembly is given an overall protective coating to reduce the effect of oxidation and erosion at field conditions. It will be understood that weld techniques, brazing material, fluxing material, and the overall protective coating are selected for operating effectiveness in the context of the particular material employed. For example, suitable brazing, fluxing, wetting, and coating techniques are described in detail, for the case of inserts of well-known cobalt-base and nickel-base superalloys, to existing investment castings, in copending application Ser. No. 17,752, filed Mar. 9, 1970, now U.S. Pat. No. 3,650,635.

FIGS. 14 and 15 illustrate application of the invention to an upgrading of a given nozzle-vane stator assembly, in the sense than an air-cooling feature is incorporated in the vanes or blade elements 60, supported by socket fit to opposed supporting or base members 10'-11'. The blade elements 60 are formed with a manifold passage 61 extending the full span $S_1$ and within the leading edge or maximum-thickness region of the blade section. Spaced elongated bleed passages 62 communicate with manifold 61 and discharge virtually tangential to the adjacent flow streamlines in the nozzle-throat region of the convex surface of the airfoil. Air-supply passages, as at 63 in base member 10' may be EDM-bored, using suitable electrode elements at 26 (FIG. 5) projecting in the direction of the upstream base member 10'. For those vane locations served by tangs, as at 53-54, it will be understood that tang location and tang-bore location (24-25) are selected to avoid interference with air supply to and manifolding within the blade elements 56.

FIGS. 16 to 20 serve to illustrate application of the invention to reconstruction of a nozzle-component assembly, which is shown in FIG. 16 as a severely worn single-piece investment casting, comprising a hollow vane 65 integrally united with buttresses 66-67 at the respective ends of the vane span. Damage to the vane 65 is evident at surface spalling 68 and at regions 69-69' of severe loss of trailing edge material, to the extent that vane 65 can no longer function (with its next adjacent similar vane, in a gas-turbine stage) with anything like acceptable nozzle performance.

According to the method of the invention, the material of vane 65 is first removed, as by saw cuts close to but spaced from the respective buttresses 66–67. After a stress-relieving heat cycle, the vane-support surfaces 70 of buttresses are machined to the design reference contour and location, whereupon vane sockets 71 are generated in such surfaces by techniques analogous to those described for the auxiliary power unit of FIGS. 1 to 13. For efficient processing, it is preferred to EDM-machined plural sockets 71 at the same time. Thus, in FIG. 19, we show an electrode base or tool holder 72 as an elongate thick plate, with plural spaced openings 73 for receiving and mounting electrode elements 74 having projecting span ends characterized by the particular airfoil section and relative angle of incidence required at juncture with the vane-supporting surface 71 of each of the respective buttresses 66–67. As with the earlier-described electrode assembly, the electrode-element openings 73 are characterized with precisely oriented flat reference surfaces, as at wall 75, to receive and locate a precisely formed flat 76 in the mid-span region of each electrode element; and clamp-screw means, suggested at 77, secures the mounting of each electrode element 74, when its trailing edge is abutted to the far end of opening 73. A suitable jig 78 appropriately retains and positions plural machined buttresses 66 with their vane-supporting surfaces facing the correctly profiled airfoil ends of electrode elements 74; in like fashion, a second suitable jig 79 is suggested by phantom outline to position plural machined buttresses 67 in spaced relation with the other correctly profiled airfoil ends of electrode elements 74.

After EDM-machining to desired depth, which, in the case of the hollow vane 66 shown, may be all the way through both buttresses, a newly cast blade element 65' (FIG. 18) is assembled to the machined buttresses in the manner already described. Thus, after plating a wettable metal on the span ends of vane 65', the parts 65'–66–67 are clamped in a suitable jig, with span ends of vane 65' substantially flush with outer walls of buttresses 66–67. At the outer adjacent flush interface edges, a weldment 80 is laid, and the filling and brazing step eliminates voids and establishes smooth fillets 81. The remaining steps, including coating, are then performed.

It will be seen that the described invention achieves all stated objects and that, although described particularly in connection with repair of worn nozzle assemblies and nozzle-component assemblies, it is also applicable to new construction of such assemblies. Vanes may be restored to a condition which in some respects exceeds the capability of original investment castings, in that new vane-element parts may be the result of optimizing material selection, for resistance to high-temperature abrasion, and for optimum diffusion coatability, in the context of less severe casting or other fabrication limitations. The indicated EDM techniques bring tool-room accuracy to the layout and assembly of the repaired structures, with resultant close control of nozzle-throat area, for a specified vane class. Assemblies built according to the invention are inherently braced to restrain and contain damage flowing from burst-wheel conditions, due to the socketed fit of the parts. The technique of welding and brazing assures utmost rigidity and integrity of the completed article, under the most extreme temperature cycles encountered in use. Finally, the technique of tool-holder construction and electrode-element retention provides relatively simple and precise controlled selection of class number, for the ultimately assembled article, without requiring any change in the vane element inserted into the vane-supporting members of the assembly.

While the invention has been described in detail for the preferred forms shown, it will be understood that modifications may be made without departing from the invention.

What is claimed is:

1. The method of reconditioning a gas-turbine vane assembly comprising base members integrally united at opposed inner faces to a blade of span extending between said members, said method comprising removing all blade material between said faces, such removal being to the extent of establishing a predetermined reference inner-face surface on each base member, recessing said inner-face surfaces with a section corresponding to desired reconditioned blade section and to a depth less than base-member thickness, selecting a new blade element (a) of length corresponding to said span plus the combined effective depth of said recesses and (b) of said reconditioned blade section, assembling said blade element to the recessed regions of said base members, and permanently securing said assembly; said recessing step comprising the further steps of selecting an elongate boring-tool element of desired bore section, mounting the two base members with their inner faces opposed at a spacing which exceeds the length of the tool element, supporting and operating said tool element with its elongation axis extending between said faces, and progressively feeding said base members with respect to each other and with respect to said tool element to the extent of said tool recessing both base members to said depth.

2. The method of claim 1, wherein said securing step includes filling and fusing all adjacent surface areas of said blade element at assembly thereof to said recesses.

3. The method of claim 1, wherein blade material is removed by first cutting the blade in a location between said base members, thereby defining separate base members each with an integral truncated fraction of a blade, and for each thus-separated member removing the truncated-blade material to the extent of said predetermined reference inner-face surface.

4. The method of claim 1, wherein said tool element is operated by subjecting said base members and tool element to an EDM environment.

5. The method of reconditioning a gas-turbine vane assembly comprising base members integrally united at opposed inner faces to a blade of span extending between said members, said method comprising removing all blade material between said faces, such removal being by the steps of first cutting the blade at a location between said base members, thereby defining separate base members each with an integral truncated fraction of a blade, and for each thus-separated member removing the truncated-blade material to a predetermined reference inner-face surface; recessing said inner-face surfaces with a section corresponding to desired reconditioned blade section and to a depth less than base-member thickness, selecting a new blade element (a) of length corresponding to said span plus the combined effective depth of said recesses and (b) of said reconditioned blade section, assembling said blade element to the recessed regions of said base members, and permanently securing said assembly.

6. The method of claim 5 including the further step of forming a through-passage in each base member from the bottom of the recess to the outer face of the base member, said through-passage being of section less than the recess section, and wherein the selected blade element includes integral axial end projections received in the respective through-passages upon said assembly.

7. The method of claim 6, in which said securing step includes welding said projections to adjacent outer regions of said base members.

8. The method of reconditioning a gas-turbine vane assembly comprising base members integrally united at opposed inner faces to a blade of span extending between said members, said method comprising removing all blade material between said faces, such removal being to the extent of establishing a predetermined reference inner-face surface on each base member, recessing said inner-face surfaces with a section corresponding to desired reconditioned blade section and to the extent of local base-member thickness; selecting a new blade element (a) of length corresponding to said span plus the combined effective depth of said recesses and (b) of said reconditioned blade section, assembling said blade element to the recessed regions of said base members, and permanently securing said assembly; said recessing step comprising the further steps of selecting an elongate boring-tool element of desired bore section, mounting the two base members with their inner faces opposed at a spacing which exceeds the length of the tool element, supporting and operating said tool element with its elongation axis extending between said faces, and progressively feeding said base members with respect to each other and with respect to said tool elements to the extent of said tool recessing both base members to said depth.

9. The method of claim 8, wherein said securing step includes welding the outer ends of said blade element to adjacent outer regions of said base members, and filling and fusing all remaining adjacent interface areas at assembly of the blade element to the base members.

10. The method of reconditioning an annular nozzle assembly for a gas-turbine, such assembly comprising an integral structure of annular base members axially spaced by plural angularly spaced bridging nozzle-blade span connections, which method comprises cutting all bridge connections to create two separate base members each with plural integral truncated blade stumps, removing blade-stump material from each such base member to a predetermined reference surface, thus defining a reference-surface inner face, recessing said faces at plural angularly spaced blade-positioning locations, said recesses being with predetermined blade section and incidence and to a depth less than base-member thickness, selecting a plurality of blade elements of said predetermined section and of length corresponding to said span plus the combined effective depth of recesses in both base members, assembling the blade elements to corresponding opposed pairs of recesses in said base members, and fusing all blade elements to said base members in such assembled relation.

11. The method of claim 10, including the further step of forming at each of at least some of the corresponding recess locations of both base members a through-passage from the bottom of each such recess to the outer face of the base member, said through-passages being of section less than the recess section, and the blade elements which are selected for assembly at through-passage recesses being further selected with integral end projections fitted to said through-passages, and welding the end projections to adjacent outer regions of said base members.

12. The method of making a gas-turbine vane assembly comprising the steps of selecting two base members to be united at opposed inner faces to a blade of span extending between said members, forming each of said faces with a recess having a section corresponding to desired blade section and to a depth less than base-member thickness, selecting a blade element of said blade section and of length corresponding to said span plug the combined effective depth of said recesses, assembling said blade element to the recessed regions of said base members, and permanently securing said assembly, said recess-forming step comprising the further steps of selecting an elongate boring-tool element of desired bore section, mounting the two base members with their inner faces opposed at a spacing which exceeds the length of said tool element, supporting said tool element with its elongation axis extending between said faces, subjecting said base members and tool element to an EDM environment wherein the tool element determines the section of bored removal of base-member material, and progressively feeding said base members with respect to each other and with respect to said tool element to the extent of tool boring both base members to said depth.

13. The method of claim 10, wherein said recessing step is performed by a tool element of said predetermined section, mounting said base members with their reference surfaces in face-to-face relation at a spacing which exceeds the length of said tool element, supporting said tool element with its elongation axis extending between said faces, subjecting said base members and tool element to an EDM envioronment wherein the tool element determines the section of bored removal of base-member material, and progressively feeding said base members with respect to each other and with respect to said tool element to the extent of tool boring both base members to said depth.

14. The method of claim 13, in which said tool element is one of a plurality of elements of said section, the same being supported in angularly spaced relation corresponding to those of said blade-positioning locations, whereby all blade-section recesses are formed in both base members in one tool-boring feed cycle to said depth.

15. The method of making an annular nozzle assembly for a gas-turbine, comprising the steps of selecting two annular base members to be united at opposed inner faces to a plurality of like blades of span extending between said members, each of said faces having recesses at a plurality of angularly spaced blade-positioning locations, said recesses being with predetermined blade section and incidence and to a depth less than base-member thickness; said recessing step being performed by a plurality of tool elements of said predetermined section, mounting said base members with their reference surfaces in face-to-face relation at a spacing which exceeds the length of said tool element, supporting said tool element with their elongation axes extending between said faces and in angularly spaced relation and incidence corresponding to those of said blade-positioning locations, subjecting said base members and tool element to an EDM environment wherein the tool element determines the section of bored removal of base-member material, and progressively feeding said base members with respect to each other and with respect to said tool element to the extent of tool boring both base members to said depth, whereby all blade-section recesses are formed in both base members in one tool-boring feed cycle to said depth; selecting a plurality of blade elements of said predetermined section and a length corresponding to said span plus the combined effective depth of recesses in both base members, assembling the blade elements to corresponding opposed pairs of recesses in said base members in such assembled relation.

16. The method of reconditioning a gas-turbine vane assembly comprising base members integrally united at opposed inner faces to a blade of span extending between said members, said method comprising removing all blade material between said faces; such blade material being removed by first cutting the blade in a location between said base members, thereby defining separate base members each with an integral truncated fraction of a blade, and for each thus-separated member removing the truncated-blade material to a predetermined reference inner-face surface; recessing said inner surfaces with a section corresponding to desired reconditioned blade section and to the extent of local base-member thickness; selecting a new blade element (a) of length corresponding to said span plus the combined effective depth of said recesses and (b) of said reconditioned blade section; assembling said blade element to the recessed regions of said base members; and permanently securing said assembly.

* * * * *